Jan. 1, 1946.   E. H. LOCKWOOD   2,392,166
CONTROL APPARATUS
Filed Sept. 11, 1942   2 Sheets-Sheet 1
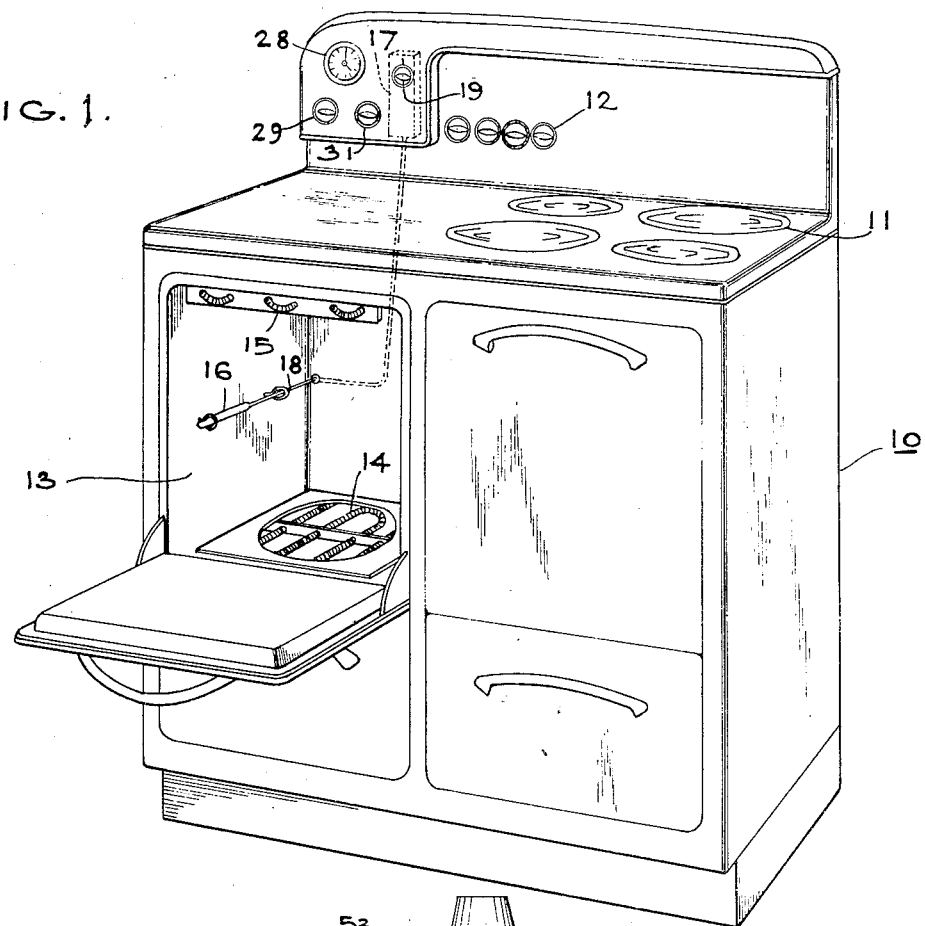
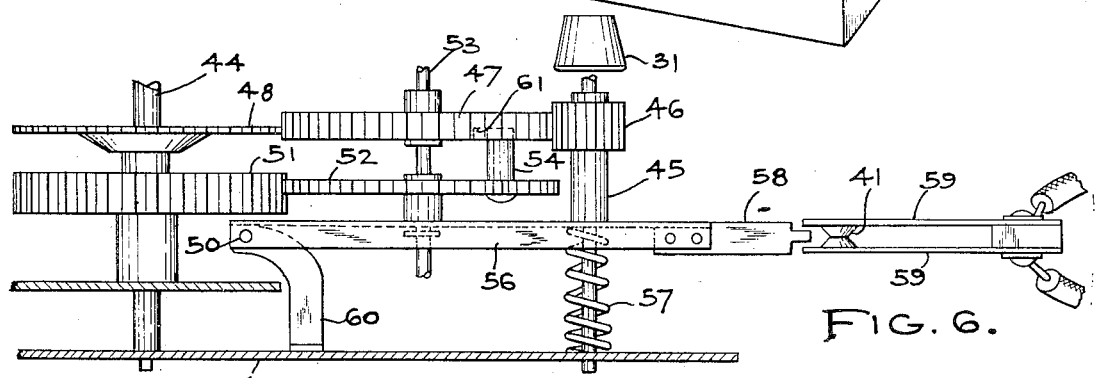
INVENTOR
EDWIN H. LOCKWOOD.
ATTORNEY Jan. 1, 1946.  E. H. LOCKWOOD  2,392,166
CONTROL APPARATUS
Filed Sept. 11, 1942   2 Sheets-Sheet 2

WITNESSES:

INVENTOR
EDWIN H. LOCKWOOD.
BY
ATTORNEY

Patented Jan. 1, 1946

2,392,166

UNITED STATES PATENT OFFICE 2,392,166

CONTROL APPARATUS

Edwin H. Lockwood, Mansfield, Ohio, assignor to Westinghouse Electric Corporation, East Pittsburgh, Pa., a corporation of Pennsylvania Application September 11, 1942, Serial No. 457,908

13 Claims. (Cl. 219—20)

This invention relates to control apparatus and particularly to an improved time and temperature control device for electric ovens and the like, and it has for an object to provide an improved device of the character set forth.

Automatic time and temperature controls are well known and generally comprise adjustable thermostatic means for regulating the temperature of the oven coupled with a clock timer. These controls permit the operator to simultaneously select the baking temperature, the time at which the oven is to be heated to begin a baking operation, and the time at which the baking is to automatically stop. To establish the automatic baking operation with these known controls, it is usually necessary for the operator to perform the following operations:

(1) Set the thermostat knob to the desired baking temperature.

(2) Set the dial of the timer which indicates the time at which the baking operation is to stop.

(3) Set the dial which indicates the number of hours the food is to be cooked or alternatively set a dial to indicate the starting time of the cooking operation.

(4) Turn a two-position switch from a position usually identified as "manual" to the "automatic" position, this switch connecting the timer to the thermostatically-controlled oven circuit.

Upon completion of the baking operation, the operator is required to perform the following operations:

(5) Return the thermostat knob to its "off" position.

(6) Turn the two-position switch back to its "manual" setting so that the oven may be used without the timer, if desired.

The above operations have caused trouble because the operators often forget to turn the two-position switch from its "manual" setting to its automatic setting when it is desired to use the timer to control the baking operation or fail to restore the thermostat knob to its "off" position and may neglect to restore the two-position switch to its "manual" setting upon completion of the baking operation. Failure to restore the two-position switch to "manual" following an automatic baking operation leaves the oven heating element circuit open at the timer so that the oven cannot be used for nonautomatic cooking or baking. It is a feature of the present invention to simplify the use of electric range controls so that at the expiration of an automatic baking operation, the oven control is automatically restored to the condition which permits manual or nonautomatic control of the oven.

It is accordingly a further object of the present invention to provide an improved oven temperature regulating and timing system which automatically conditions the oven controls for manual operation upon the expiration of baking operation employing automatic time and temperature control.

These and other objects are effected by the invention as will be apparent from the following description and claims taken in connection with the accompanying drawings, forming a part of this application, in which:

Fig. 1 is a perspective view of an electric cooking range in which the present invention is incorporated;

Figs. 6, 7 and 8 are detail views of a portion of the timer mechanism showing the critical positions of certain parts of the timer.

Figure 2:
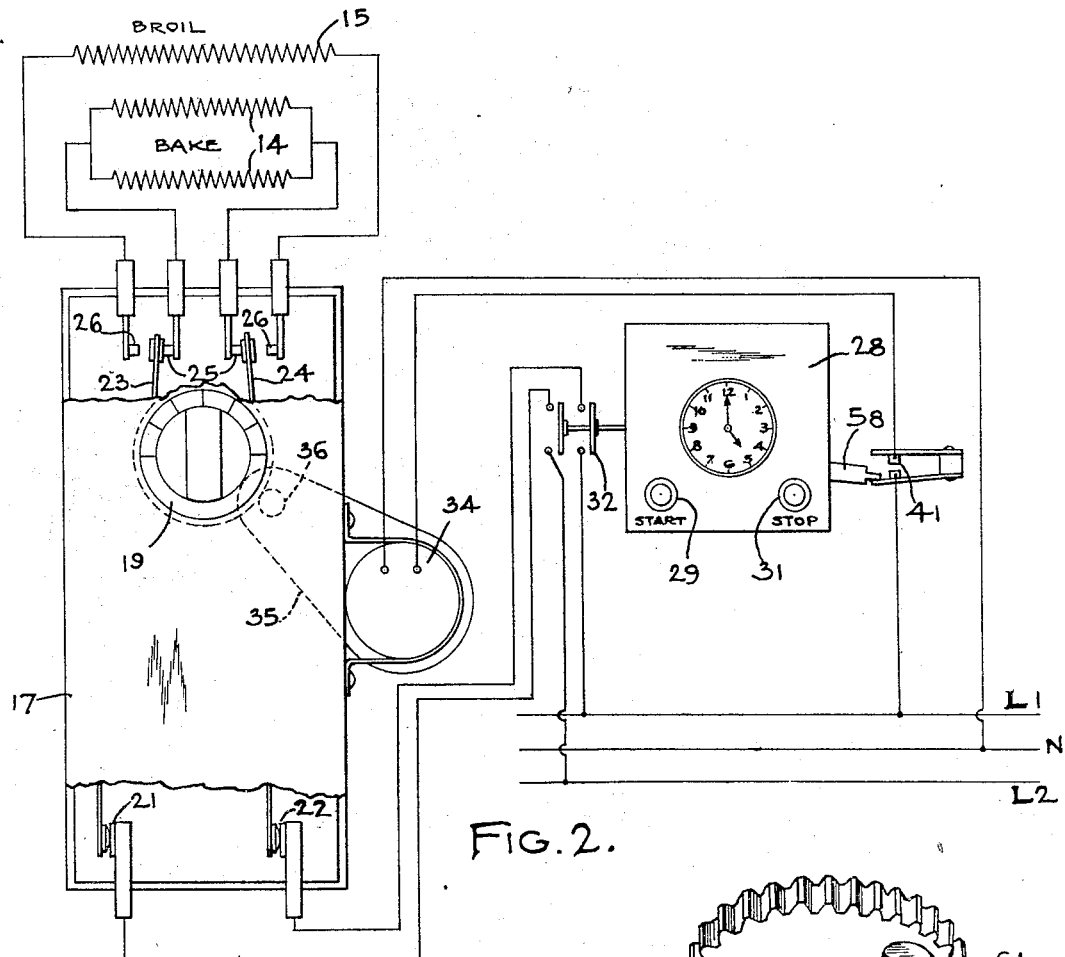
Fig. 2 is a diagrammatic view of the electric circuits and controls therefor of the oven heating elements of the range shown in Fig. 1, the parts being shown in the position they assume during the waiting period of an automatic baking operation.
Figure 4:
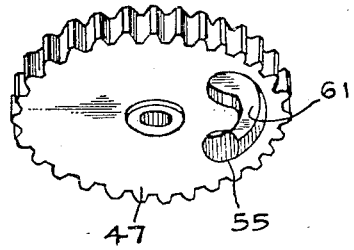
Fig. 4 is a perspective view, looking from below, of a gear employed in the timer of the present oven control.
Figure 5:
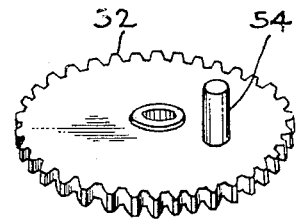
Fig. 5 is a perspective view, looking from above, of a second gear of the timer.

The electric range 10 illustrated in Fig. 1 may be of conventional construction including surface units 11, the operation of which is controlled by knobs 12. The oven, generally indicated 13, is provided with conventional baking and broiling electric heating elements 14 and 15, respectively. Baking element 14 preferably takes the form of two resistors, one located at the bottom of the oven and the other at the top and carried by the same support which carries the broil element 15. The heating elements are shown diagrammatically in Fig. 2.

The oven 13 is also provided with a bulb 16 of a hydraulic thermostat which is connected to a temperature-regulating device, generally indicated 17, by means of a capillary tube 18. While the invention is shown as employing a hydraulic type of thermostat, it is to be understood that the invention is not limited thereto since other types of temperature-responsive devices, such as a bimetallic thermostat, may be used if desired.

The temperature-regulating device 17 is of known construction and is enclosed within a housing which may be mounted conveniently at the rear of the backsplasher, as shown by dotted lines in Fig. 1, with its adjusting knob 19 accessible at the front. It includes a thermostat which is adjusted in a known manner by means of the knob 19, and which actuates switch contacts 21 and 22 to control the supply of electrical energy to the oven heating elements 14 and 15. Manipulation of the knob 19 also actuates movable contacts 23 and 24 to bring them into engagement with contacts 25 for connecting the bake elements 14 in series with contacts 21 and 22, or into engagement with contacts 26 to connect the broil element in series with contacts 21 and 22. The movable contacts 23 and 24 are also positionable, by means of the knob 19, in the space between the contacts 25 and 26 so that the elements 14 and 15 are open circuited, this position of the movable contacts being the "off" position of the switch knob 19.

As well understood in the art, when the switch knob 19 is adjusted to move the contacts 23 and 24 into engagement with contacts 26, that is, the "broil" setting of the switch knob, the thermostat is simultaneously adjusted so that it will not open the contacts 21 and 22 at any temperature normally encountered when the oven is being used for broiling.

The switch knob 19 is movable throughout the major portion of its range, while the contacts 23 and 24 remain in engagement with the contacts 25, to adjust the thermostat over a wide temperature range. It is, of course, understood that the thermostat is calibrated to open the contacts 21 and 22 whenever the oven is at the temperature selected by the knob 19.

In order to permit the operator or user of the range to set the oven controls so that a baking operation may be started and completed at a later time, there is provided a timer, generally indicated 28, which, except as hereinafter pointed out, may be of conventional construction. This timer comprises the usual clock mechanism and is provided with a "start" button 29 and a "stop" button 31. The start button 29 is used to set the time at which it is desired to begin a baking operation, while the stop button 31 is used to fix the time at which the baking operation is to stop.

Setting of the start button 29 so that a baking operation may be begun at a later time opens a normally closed double-pole switch, generally indicated 32, this switch being closed at the time selected by the start button. By reference to Fig. 2, it will be noted that closing of the double-pole switch 32 completes a circuit from the supply lines L₁ and L₂, through the closed switch 32 and closed contacts 21 and 22, closed contacts 23, 24 and 25, to the bake elements 14. During the baking period, the circuit is under the control of the thermostat-actuated contacts 21 and 22.

Heretofore, it has usually been the practice for the "stop" mechanism of the timer to open the switch 32 at the expiration of the baking operation to thereby deenergize the oven heating elements. It has also been necessary for the user to manipulate an auxiliary two-position switch or some equivalent device to connect the oven elements and the thermostat switch across the line when the oven was to be used without the automatic timer control. With the present invention, the switch 32 remains closed at all times, except during the waiting period from the time that the timer is set until a baking operation is to begin, and thereby allows the oven to be used solely under the control of the temperature regulator 17 or in conjunction with the timer, at will.

Figure 3:
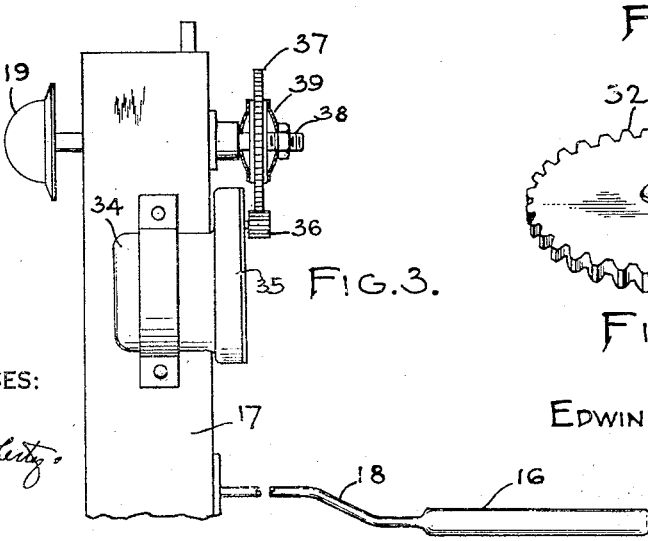
Fig. 3 is a side elevational view of the temperature-regulating and circuit-selecting switch unit forming a part of the present invention.

To accomplish this result and to thereby simplify the use of the range oven, there is provided a small electric motor 34, here shown as mounted on the housing of the temperature regulator 17, which turns the knob 19 back to its "off" position at the end of a baking period. This motor preferably includes a speed-reduction unit 35 which drives a slow-speed pinion 36, see Fig. 3. Pinion 36 in turn engages and drives a gear 37 connected to the switch shaft 38 by means of a friction clutch 39. The friction clutch 39 permits the motor to overrun after the switch knob 19 and its shaft 38 have been restored to the "off" position, without causing any damage to the switch mechanism, and also permits the knob 19 to be manipulated when the motor is idle.

The shaft 38 carries the knob 19 and is provided with suitable means, such as cams and the like, for manipulating the movable contacts 23 and 24 as well as means for adjusting the thermostat.

The motor 34 is connected to the supply conductor L₁ and the neutral conductor N in series with a switch, generally indicated 41, and is so arranged that when the switch 41 is closed, the motor, through gears 36 and 37, will turn the switch shaft 38 back to its "off" position and thereby shift the movable contacts 23 and 24 to a center position between the contacts 25 and 26 of the oven heating elements. Thus, at the time the baking operation is to stop, as determined by the setting of the stop button 31, the timer automatically closes the switch 41 for a brief interval of time, such as five minutes. During this time, the motor 34 is energized and it rotates the switch shaft 38 until it reaches the "off" position. When the switch shaft 38 reaches the "off" position, further movement is prevented by the usual stop, continued operation of the motor for the remainder of the interval of time being permitted by the clutch 39. An interval of time is chosen which is sufficient to assure that the switch 17 is moved all the way to the "off" position regardless of where it may have been set.

At the end of the interval of time, the switch 41 opens to stop the motor 34 and then it remains open. The automatic cycle is thereupon terminated, leaving the control conditioned for manual operation in the usual manner, that is, the user may, at any time thereafter, obtain heating of the oven by actuating the knob 19 in the usual manner. Since the switch 32 is left in closed position, the temperature regulator 17 is effective when actuated to complete the circuit to one of the heating elements. Relative movement between the motor 34 and the switch 17 upon actuation of the latter is permitted by the clutch 39. Referring to the clock timer 28, it includes suitable mechanism which closes the switch 32 at the selected time and leaves it closed until the next time-controlled operation. Since mechanisms of this character are well known, detail description thereof is not necessary.

The clock timer further includes mechanism which operates, when it is set, to close the switch 41 at the time for which the stop button is set and then does not again close the switch 41 until the next time-controlled operation, that is, until the stop button is again set and the preselected time has arrived. While the invention is not limited thereto, there is shown in Figs. 4 to 8, inclusive, a suitable mechanism for actuating the switch 41.

In Figs. 6, 7 and 8, a portion only of a conventional timer and the mechanism added thereto is shown. The timer comprises a base 43 on which is journaled the hour shaft 44 of the timer. This base slidably receives a stepped shaft 45 to which is fixed the stop button 31 of the timer. A pinion 46, carried by the shaft 45, engages a gear 47 which in turn drives a gear 48 freely rotatable on the hour shaft. The latter gear 48 is connected to or, in itself, comprises a dial for indicating the stopping time of the baking operation. Thus, by manipulating the button 31, gears 46, 47 and 48 position the dial to indicate the time at which the baking operation is to stop.

A gear 51, fixed to the hour shaft 44, engages and drives a gear 52. The gear 52 as well as the gear 47 is mounted for rotation on a shaft 53 suitably supported within the timer housing. The gear 47 is fixed against longitudinal movement on this shaft while the gear 52 is free to move longitudinally therealong, as is apparent from a comparison of Figs. 6, 7 and 8 which illustrate three critical positions of this gear. The gears 47 and 52 are normally coupled by means of a pin 54 fixed to the lower gear 52 and receivable in an opening 55 (see Fig. 4) extending through the gear 47 so that gear 47 is driven by gear 52.

The shaft 53 extends through a channel 56 which is pivoted at 30 to a bracket 60 carried by the base 43. This channel carries the gear 52 and is depressible by means of the stop button 31, against the resistance of compression spring 57, to disengage the pin 54 from the opening 55 in gear 47 and thereby uncouple the gears 47 and 52. The free end of the channel 56 is provided with a finger 58, of insulating material, which extends between and actuates spring arms 59 of the switch 41 as will appear later.

Referring to Fig. 7, the parts are there shown in the position they assume when the pin 54, carried by the lower gear 52, is disposed within the opening 55 of the gear 47. This position of the parts, which may be termed the normal position, represents the condition when the timer is not being used to control the oven heating elements. When the operator desires to set the button 31 to condition the control for stopping the baking operation at some future time, she depresses the button 31 which causes the parts to assume the position shown in Fig. 8, where it will be noted the insulating finger 58 holds the contacts of switch 41 open, and then rotates the knob to set the stop-indicating dial 48. Depression of the button 31 lowers the pin 54 clear of the opening 55 and the subsequent rotation of this button rotates the gear 47 so that the top of the pin 54 now rides on the under surface of the gear 47, which now remains stationary, to maintain the parts in the position shown in Fig. 8.

It will be understood that the hour shaft 44 rotates continuously and drives the gear 52 so that the pin 54 gradually approaches the opening 55, the apparatus having been adjusted in the manner described above to bring the pin 54 to the opening 55 at the time set on the dial 48. However, before reaching the opening 55, the pin 54 is biased upwardly, by means of spring 57, into a shallow recess 61 provided in the under surface of the gear 47, as shown in Fig. 6. When the pin enters into and rides in this recess, the switch-actuating finger 58 is held clear of the contact arms 59 and the switch 41 is closed.

As previously pointed out, closing of the switch 41 completes a circuit for the motor 34 and it restores the adjusting knob 19 and the parts actuated thereby to the "off" position of the control.

The recess 61 is preferably of such length as to maintain the switch 41 closed for an interval of from five to ten minutes so that by the time the pin 54 reaches the opening 55, the motor 34 will have had sufficient time to restore the control to its "off" position. When the pin 54 is aligned with the opening 55, the spring 57 forces the pin into the opening, bringing the parts to the position shown in Fig. 7, the motor switch 41 being held open by finger 58.

From the above description, it will be seen that there is provided an automatic oven control in which the operator need merely set the knob 19 for the desired oven temperature and position the "start" and "stop" buttons 29 and 31, respectively, to fix the time at which it is desired for the baking operation to begin and the time at which it is desired to have the baking operation completed. Upon completion of the baking operation, no further manipulation of the control is necessary since the knob 19 is automatically restored to its "off" position and the switch 32 remains closed.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. A control system for electric heating means comprising manually adjustable means, thermostatic means, said manually adjustable means being movable to a first position to maintain the heating means continuously deenergized and to at least one other position to provide energization of the heating means under the control of said thermostatic means, timer means associated with said thermostatic means and adjustable to delay the energization of said heating means for a preselected period, and adjustable means controlled by said timer means to automatically restore said manually adjustable means to said first position.

2. A control system for electric heating means comprising manually adjustable means, said manually adjustable means being movable to a first position to maintain the heating means continuously deenergized and to at least one other position to provide energization of the heating means, timer means associated with said means and adjustable to delay the energization of said heating means for a preselected period, and adjustable means controlled by said timer means to automatically restore said manually adjustable means to said first position.

3. A control system for electrical heating means comprising a switch movable to a first position to connect said heating means to a source of electrical energy and to a second position to disconnect said heating means from said source of electrical energy, timer means associated with said switch and arranged to maintain said heating means deenergized for a preselected period while said switch is in said first position and thereafter maintain said heating means energized for a second period, and means controlled by said timer means to move said switch to said second position at the expiration of said second period.

4. A control system for electrical heating means comprising a switch movable to a first position to connect said heating means to a source of electrical energy and to a second position to disconnect said heating means from the source of electrical energy, a second switch connected in series with said first-mentioned switch, timer means arranged to close said second switch at a selectable time, and means controlled by said timer means for moving said first-mentioned switch to said second position at a time subsequent to the closing of said second-mentioned switch.

5. A control system for electrical heating means comprising a thermostatically-actuated switch operated in response to a temperature condition effected by said heating means, manual means movable between an "off" position to at least one active position for adjusting said thermostatic means, timer means associated with said thermostatic means and arranged to cause energization of said heating means for a preselected period under the control of said thermostatic means, and means controlled by said timer means to automatically restore said manual means to its "off" position.

6. A control system for electrical heating means comprising adjustable thermostatic means adapted to control the energization of said heating means, said means being movable to a position to maintain the heating means deenergized and to at least one other position to provide energization of the heating means under the control of said thermostatic means, and timer means adapted to restore said thermostatic means from said other position to the first-mentioned position at the expiration of a preselected interval.

7. In a control for a heating element, a manually-actuated switch movable to an "off" position and to a plurality of positions effecting varying degrees of heating of said heating element, a second switch in series with said manually-actuated switch, time set means operable when set to open said second switch until a preselected time and then to close said switch and to leave it closed until such means is again set, and time set means for moving said manually-actuated switch to "off" position.

8. In a control for a heating element, the combination of manually-actuated switch means movable to an "off" position and to a plurality of circuit-closing positions providing varying degrees of heating, timer mechanism including time set means operable when set to open the circuit until the set time occurs and then being inoperable to open the circuit until it is reset and further including time set means for moving said manually-actuated switch means to the "off" position at the set time and being then inoperative until it is again set and the set time occurs, whereby, upon completion of a time-controlled cycle, said manually-actuated switch means becomes operative upon manual actuation.

9. In a control for a heating element, the combination of manually-actuated switch means movable to an "off" position and to a plurality of circuit-closing positions providing varying degrees of heating, timing means for preventing energization of said heating element, independently of the position of said manually-actuated member, until a predetermined or set time, said last-mentioned means being thereafter inoperative to prevent energization of said heating element until it is reset, and timing means for moving said manually-actuated switch means to the "off" position at a predetermined or set time.

10. In a control for an electric heating element the combination of means including and controlled by a manually-actuated member for effecting varying degrees of heating of the heating element, time-controlled means for preventing energization of the heating element, independently of the setting of said manually adjusted means, until a preselected time and then rendering the manually adjustable means effective to control energization of the heating element and means for terminating energization of said heating element at a preselected later time and for conditioning the control to energize said heating element upon actuation of said manually-actuated member.

11. In a control for controlled apparatus, the combination of a control mechanism including a manually actuated member movable to a first position and to a plurality of operating positions, said control mechanism operating to effect different conditions of operation of the controlled apparatus upon positioning said member in the different operating positions, time-controlled means adapted to be set to a preselected first time and to a preselected second time, means controlled by said time-controlled means and operable upon setting said time-controlled means to a pre-selected first time to interrupt the control of the controlled apparatus by said control mechanism and to restore said control thereto upon the occurrence of said preselected first time, and means controlled by the time-controlled means and operable upon occurrence of the preselected second time to actuate said manually-actuated member to said first position.

12. In a control for an electrically-controlled device, the combination of a control mechanism including switch means controlling a circuit for said controlled device and further including a manually-actuated member movable to an "off" position and to a plurality of operating positions, said control mechanism operating said switch means to open said circuit upon positioning said member in the "off" position and to effect different conditions of operation of the controlled device upon positioning said member in the different operating positions, a second switch connected in said circuit in series with the switch means of said control mechanism, means for mechanically actuating said manually-actuated member to said "off" position, time-controlled means adapted to be set to a preselected future "on" time and operable when so set to cause said second switch to be open until the preselected "on" time occurs and thereupon to cause said second switch to close and remain closed until the time-controlled means is again set to a preselected future "on" time, and time-controlled means adapted to be set to a predetermined future "off" time and operable to cause said actuating means to actuate said member to said "off" position when said preselected "off" time occurs.

13. In a control for electrically-energized apparatus, the combination of a control mechanism including a manually-actuated member movable to an "off" position and to a plurality of operating positions, said control mechanism serving to prevent energization of said apparatus when said member is in the "off" position and to effect different conditions of operation of said apparatus upon positioning said member in the different operating positions, time-controlled means adapted to be set to a preselected future "on" time and operable when so set to prevent energization of said apparatus regardless of the position of said member until the preselected "on" time occurs and thereupon to restore control of said apparatus to said control mechanism until said time-controlled means is again set to an "on" time, and time-controlled means adapted to be set to a preselected future "off" time and operable upon occurrence of said preselected "off" time to actuate said manually-actuated member to said "off" position.

EDWIN H. LOCKWOOD.